UNITED STATES PATENT OFFICE.

MAX GLASS, OF VIENNA, AUSTRIA-HUNGARY.

PROCESS OF BRIQUETING METALS CONTAINING COPPER.

1,008,254.  Specification of Letters Patent.  Patented Nov. 7, 1911.

No Drawing.  Application filed March 17, 1910. Serial No. 549,994.

*To all whom it may concern:*

Be it known that I, MAX GLASS, a subject of the King of Austria, residing at Hadikgasse 176, Vienna, Austria-Hungary, have invented certain new and useful Improvements in Processes of Briqueting Metals Containing Copper; and I do hereby declare the following to be a full, clear, and exact description of the invention, such as will enable others skilled in the art to which it appertains to make and use the same.

My invention relates to a process of briqueting metals containing copper, such as shavings and the like, and is based on adding to the mass suitable agents which form with the cupric oxid of the briqueting material a compound which decomposes readily in heat, cupric oxid being separated in a state of fine division. This has proved to be in this state a good binding agent for cupreous material.

According to experiments made which led to my invention I have found that the materials in question can be briqueted in an exceedingly advantageous manner by treating the mass, which very readily forms cupric oxid on its surface when exposed to the air, with ammonia.

The cupric oxid forms with the ammonia a blue solution of varying composition namely cuprammonium or ammoniacal cupric oxid, which is distributed uniformly in the product. If the material thus treated is then pressed and subsequently heated, the cuprammonium is decomposed and cupric oxid is distributed uniformly on the surface of the metal where it forms a good cement for the material to be briqueted.

In the event of the cupriferous material, waste metal and the like which is to be briqueted being still new and bright, it is preferable, for promoting the formation of cupric oxid before the briqueting process, i. e. before the action of the reagents, to heat the metal to approximately 100° C. which is important for improved durability or stability particularly when new material is employed.

One mode of carrying my process into practice is as follows:—The metal to be briqueted is first treated with ammonia, which may be employed in form of an ammoniacal solution so that all the parts are covered on their entire surface as uniformly as possible therewith; the treated material is then subjected to the pressure and subsequently heated. Instead of ammonia, ammonium carbonate solution can be advantageously employed, a 3-6% solution being preferably used. Quicklime is then added to the treated material and the briquets are exposed to the air after they have been pressed. Owing to the admixture of lime it is superfluous to heat the mixture artificially for the purpose of starting the chemical process, because after the pressing operation the mass heats spontaneously in consequence of the slaking of the quicklime. In this process ammonia is likewise formed which forms with the uniformly distributed cupric oxid of the metal mass a blue solution of cuprammonium which is distributed uniformly in the material to be briqueted. In consequence of the heat of absorption constantly produced owing to the slaking of the quick-lime, cupric oxid is then separated which is very finely distributed in the material to be briqueted and has an agglutinative action on the individual metallic particles of the same. In this process there is produced simultaneously with cupric oxid calcium carbonate in addition which likewise is a very good agglutinant.

The chemical reaction in this process takes place in the following steps:—

(a) Slaking the lime:

$$CaO + H_2O = Ca(OH)_2.$$

(b) Liberation of ammonia:

$$NH_4HCO_3 + CaO = NH_4OH + CaCO_3.$$

(c) Formation of cuprammonium solution i. e., solution of $NH_4OH + CuO$.

Instead of ammonium carbonate (which is represented in the above equation b by the symbol for ammonium acid carbonate by reason of the fact that commercial carbonate, upon exposure to the air, gradually changes to ammonium acid carbonate or bicarbonate) I may very advantageously employ ammonium chlorid and carry into practice the above described process with the same. When using ammonium chlorid it is preferable to mix the material with a 5% ammonium chlorid solution, 1 kg. material being mixed with 10 ccm. of the 5% solution, the material being then mixed with quicklime and heated slowly after it has been pressed. The reactions take place in approximately the same manner as when ammonium carbonate is employed, but instead of calcium carbonate, calcium chlorid is formed according to the following formula:—

(b) $2NH_4Cl + CaO + H_2O = 2NH_4OH + CaCl_2$

I claim:—

1. The process of briqueting cupriferous metals, particularly cupriferous metal shavings and the like, which consists in treating the material with ammonia in the presence of copper oxid, pressing the treated material, and subsequently heating the same.

2. The process of briqueting cupriferous metals, particularly cupriferous metal shavings and the like, which consists in treating the material with a solution containing ammonia in the presence of copper oxid, pressing the treated material and subsequently heating the same.

3. The process of briqueting cupriferous metals, particularly cupriferous metal shavings and the like, which consists in treating the material with a solution of ammonium carbonate containing an admixture of quick lime in the presence of copper oxid and in pressing the treated material.

4. The process of briqueting cupriferous metals, particularly cupriferous shavings and the like, which consists in treating the material with a solution of an ammonium compound in the presence of copper oxid, mixing quick lime therewith, pressing the mixture thus obtained, and subsequently slowly heating the same.

5. The process of briqueting cupriferous metals, particularly cupriferous shavings and the like, which consists in treating the material with the solution of an ammonium compound in the presence of copper oxid, pressing the same and heating by means of slackening of the admixed quicklime, substantially as described.

6. The process of briqueting cupriferous metals, particularly cupriferous metal shavings and the like, which consists in heating the material to approximately 100° C. to promote the formation of copper oxid, treating the material with ammonia in the presence of the copper oxid, pressing the treated material, and subsequently heating the same.

In testimony whereof I have signed my name to this specification, in the presence of two subscribing witnesses.

MAX GLASS.

Witnesses:
AUGUST FUZZER,
ADA MARIE BERGER.